United States Patent
Reinders

(10) Patent No.: US 7,181,918 B2
(45) Date of Patent: Feb. 27, 2007

(54) VEHICLE COOLER

(75) Inventor: Johannes Antonius Maria Reinders, Warnsveld (NL)

(73) Assignee: Oxycell Holding B.V., Raalte (NL)

( * ) Notice: Subject to any disclaimer, the term of this patent is extended or adjusted under 35 U.S.C. 154(b) by 401 days.

(21) Appl. No.: 10/808,342

(22) Filed: Mar. 25, 2004

(65) Prior Publication Data

US 2005/0210892 A1   Sep. 29, 2005

(51) Int. Cl.
*F28C 1/00* (2006.01)
(52) U.S. Cl. .......................................... 62/121; 62/244
(58) Field of Classification Search ................. 62/121, 62/244, 310, 314
See application file for complete search history.

(56) References Cited

U.S. PATENT DOCUMENTS

| | | | |
|---|---|---|---|
| 4,002,040 A | 1/1977 | Munters et al. |
| 4,040,804 A | 8/1977 | Harrison |
| 4,350,570 A | 9/1982 | Maisotsenko et al. |
| 4,674,295 A | 6/1987 | Curtis, Sr. |
| 4,842,052 A | 6/1989 | Gershuni et al. |
| 4,971,245 A | 11/1990 | Maisotsenko et al. |
| 4,976,113 A | 12/1990 | Gershuni et al. |
| 4,977,753 A | 12/1990 | Maisotsenko et al. |
| 5,009,263 A | 4/1991 | Seshimo et al. |
| 5,187,946 A | 2/1993 | Rotenberg et al. |
| 5,212,956 A | 5/1993 | Tsimerman |
| 5,301,518 A | 4/1994 | Morozov et al. |
| 5,315,843 A | 5/1994 | Morozov et al. |
| 5,349,829 A | 9/1994 | Tsimerman |
| 5,453,223 A | 9/1995 | Maisotsenko |
| 5,718,848 A | 2/1998 | James |
| 5,800,595 A | 9/1998 | Wright |
| 6,338,258 B1 | 1/2002 | Lee et al. |
| 6,497,107 B2 | 12/2002 | Maisotsenko et al. |
| 6,581,402 B2 | 6/2003 | Maisotsenko et al. |
| 2002/0038552 A1 | 4/2002 | Maisotsenko et al. |
| 2002/0073718 A1 | 6/2002 | Maisotsenko et al. |
| 2003/0033821 A1 | 2/2003 | Maisotsenko et al. |
| 2003/0126876 A1 | 7/2003 | Maisotsenko et al. |
| 2003/0145609 A1 | 8/2003 | Maisotsenko et al. |

FOREIGN PATENT DOCUMENTS

| | | |
|---|---|---|
| BE | 09900778 A6 | 10/2001 |
| EP | 1081440 A2 | 3/2001 |
| NL | 7711149 | 4/1979 |
| WO | WO 87/01180 A1 | 2/1987 |
| WO | WO 97/35152 A1 | 9/1997 |
| WO | WO 99/41552 A1 | 8/1999 |

*Primary Examiner*—Melvin Jones
(74) *Attorney, Agent, or Firm*—David P. Owen; Howrey LLP

(57) ABSTRACT

A vehicle cooler is described for providing low energy cooling to the interior of a vehicle without the use of refrigerant or a compressor. The cooler uses the evaporation of liquid from a secondary surface of a heat exchange element to cool air passing over a primary surface of the heat exchanger. The primary air is distributed to the interior of the vehicle via an air distribution mechanism, which may be adjusted from within the vehicle. The device is particularly useful for recreational vehicles.

20 Claims, 5 Drawing Sheets

VEHICLE COOLER

BACKGROUND OF THE INVENTION

1. Field of the Invention

The invention relates generally to vehicle coolers and more particularly to a device for cooling the interior passenger space of a vehicle such as truck or recreational vehicle.

2. Description of the Related Art

It is customary for vehicle manufacturers to include air conditioning systems in their vehicles to provide cooling air to the vehicle interior. Such systems are now standard on many models and generally work in a similar way to domestic air conditioners. The air to be cooled is passed over a heat exchange element. Within the heat exchange element, a refrigerant absorbs heat from the air and transports it away. The refrigerant is driven around a closed circuit by a compressor. Known air conditioning devices of this type require substantial energy to drive the compressor and additionally often make considerable noise.

Energy consumption is increasingly of significance to consumers. For users of vehicles with such air conditioning systems, this may manifest itself in the form of increased fuel consumption. Additionally, such air conditioning systems may require more power than a battery supply can provide for more than a short period. To maintain operation of an air conditioner in a stationary vehicle the engine must be left running to prevent the battery from discharging. For trucks and buses running on idle while the driver rests, the noise, fumes and energy consumption are all a significant problem.

In an alternative frequently used by recreational vehicles and caravan trailers, an additional generator may be used to provide power supply to operate the air conditioner and other appliances. Such generators may be located at a distance from the vehicle but also causes additional noise to that already produced by the air conditioning compressor. They also lead to additional energy consumption and are not suitable for being left on for long periods.

There is thus a particular need for a vehicle cooler that can operate quietly with minimal power supply. Ideally, the cooler should be able to provide adequate cooling to a vehicle interior for an extended period using only an existing vehicle battery supply.

One type of cooling device that operates without a compressor is the evaporative cooler. The principle of evaporative cooling has been known for many centuries. For example, a damp cloth placed over an object will keep the object cool by evaporation of liquid from the cloth. By continuously adding liquid to the cloth, the cooling effect may be maintained indefinitely without input of electrical energy. An evaporative cooler makes use of this principle. An air stream over a first wetted surface of a heat exchange element absorbs moisture from the surface by evaporation. A second stream over a second surface of the heat exchange element may then be cooled by contact with the second surface. The lowest temperature that can be reached by evaporation of moisture in this way into an air stream defines the wet-bulb temperature for that air.

If a quantity of air is cooled by direct evaporation its absolute humidity increases due to the uptake of moisture. Its relative humidity also increases due to its lowered temperature until at the wet bulb temperature it is full saturated with water vapour. If the air is cooled however without direct evaporation, its absolute humidity remains the same. As its temperature decreases only the relative humidity increases until full saturation of the air is reached at the so-called dew point. The dew point is thus lower than the wet bulb temperature and is in fact defined as the temperature to which a body of air must be cooled to reach saturation or 100% relative humidity. At this point, water vapour in the air condenses.

Evaporative coolers have however been found relatively inefficient in lowering the temperature of the ambient air to acceptable values. In order to provide sufficient cooling, especially in humid climates, a large heat exchange surface is required. Evaporation of the water is often not optimized and only a part of the available energy that could be used for cooling is actually used. As a result, water consumption is high. Such devices have also been found impractical for use on most vehicles due to their relatively bulkiness for a given cooling capacity.

One device which attempts to overcome the problems of evaporative cooling for use in vehicles is known from U.S. Pat. No. 6,497,107 to Maisotsenko et al. In this document, use is made of the evaporation of the fuel for an internal-combustion engine to provide cooling. The product fluid in such cases must be isolated from the working fluid to avoid any chance of the evaporated fuel entering the passenger space of the vehicle. Furthermore, the amount of fuel available for evaporation is limited and the system is not effective once the engine has stopped. An alternative device for use in vehicles without fuel is also described. This device needs to be combined with a desiccant or other device for drying the air prior to moisturizing. The requirement of such desiccant or additional heating means makes the device unsuitable for continued operation on a low power supply such as is available from a normal vehicle battery.

BRIEF SUMMARY OF THE INVENTION

The present invention addresses these problems by providing a vehicle cooler having both low energy consumption and low weight and volume for a given cooling capacity. The cooler is suitable for use under most climatic conditions. In order to achieve the necessary efficiency and operating characteristics for use in cooling the interior space of a vehicle for extended periods the cooler has a high cooling capacity with little power consumption and low weight. According to a preferred embodiment, a vehicle cooler is achieved weighing less than 40 Kg and having a cooling capacity of more than 1 KW under most climatic conditions for an energy consumption of less than 250 W. This and other advantages may be achieved by use of an indirect evaporative heat exchanger which converts a flow of ambient air into a flow of cooled air having a temperature below a wet bulb temperature of the ambient air. A preferred form of evaporative heat exchanger is the dewpoint cooler, which may reduce the temperature of the air below the wet bulb temperature and to close to the dewpoint of the ambient air. Of particular significance, these advantages are achieved without requiring either a compressor or a refrigerant, making the cooler extremely quiet and environmentally friendly.

According to the invention there is provided a vehicle cooler for cooling a flow of primary air from a first temperature to a second temperature and delivering at least a portion of the primary air at the second temperature to a vehicle interior, the vehicle cooler comprising a first surface for cooling the primary air, a second surface for humidifying a flow of secondary air by evaporation of liquid from the surface; and a plurality of heat transfer elements for transferring heat from the first surface to the second surface wherein the second temperature is below a wet bulb temperature of the primary air.

Preferably the vehicle cooler is constructed in such a way that the secondary air is derived from a portion of the primary air by separating it from the flow of primary air after cooling thereof by the first surface. This may be achieved by providing first and second channels for the primary and secondary air respectively and providing a bypass or a number of bypasses for at least part of the air to pass from the primary channel to the secondary channel.

Advantageously, the first and second surfaces of the vehicle cooler may comprise opposite surfaces of a heat exchange membrane. The primary and secondary air may then preferably flow in counter flow over these opposing surfaces. Such an arrangement is considered advantageous in terms of efficiency of operation.

Alternatively a cross-flow arrangement may be used in which the primary air flows over the first surface in a first direction and the secondary air flows over the second surface in a second direction substantially perpendicular to the first direction. Such an arrangement may be advantageous for constructional reasons.

In a particularly advantageous embodiment the heat transfer elements may comprise elements or protrusions attached to or formed on the heat exchange membrane. These heat transfer elements serve to increase an effective surface area of the membrane. The elements may be formed as fins and may be generally aligned with a direction of air flow or may be used to cause alignment of the flow. Such elements have been found extremely advantageous in increasing heat conduction between membrane and flow. While not wishing to be bound by theory it is believed that this may be due to various mechanisms including increased surface area and improved break-up of the various boundary layers in the flow. The elements may also be provided with further break-up means such as surface roughness or louvers or the like.

In a particularly advantageous embodiment, at least the second surface may comprise a liquid retaining layer for retaining a liquid to be evaporated. The presence of an appropriate liquid retaining layer is an important factor in ensuring effective evaporative cooling below the wet bulb temperature.

Most preferably, the secondary air is cooled to a temperature below the first temperature prior to humidifying at the second surface. By this mechanism, it has been found that a greater quantity of thermal energy can be transferred from the primary air to the secondary air resulting in more effective cooling of the primary air to below its wet bulb temperature.

The vehicle cooler preferably comprises a housing for containing the first and second surfaces and including flow channels for directing the flows of primary air and secondary air. For use on the exterior of a vehicle, the housing may be aerodynamically shaped. Preferably the vehicle cooler may be attached e.g. to a roof of a vehicle and the housing has an outlet for primary air arranged to engage with a corresponding opening into an interior of the vehicle. The opening or outlet may be provided with appropriate grills, ducts and controls whereby operation of the vehicle cooler can be controlled from inside the vehicle.

The invention also relates to a method of cooling the interior living space of a vehicle comprising passing a flow of primary air over a first surface to cool the primary air from a first temperature to a second temperature below the wet bulb temperature of the primary air, conducting heat from the first surface to a second surface, supplying water to the second surface, passing a first portion of the flow of primary air over the second surface to absorb water from the second surface; and supplying a second portion of the primary air at the second temperature to the interior living space of the vehicle.

BRIEF DESCRIPTION OF THE DRAWINGS

An embodiment of the invention will now be explained in further detail by way of example only with reference to the accompanying figures, in which.

DESCRIPTION OF ILLUSTRATIVE EMBODIMENTS

Figure 1:
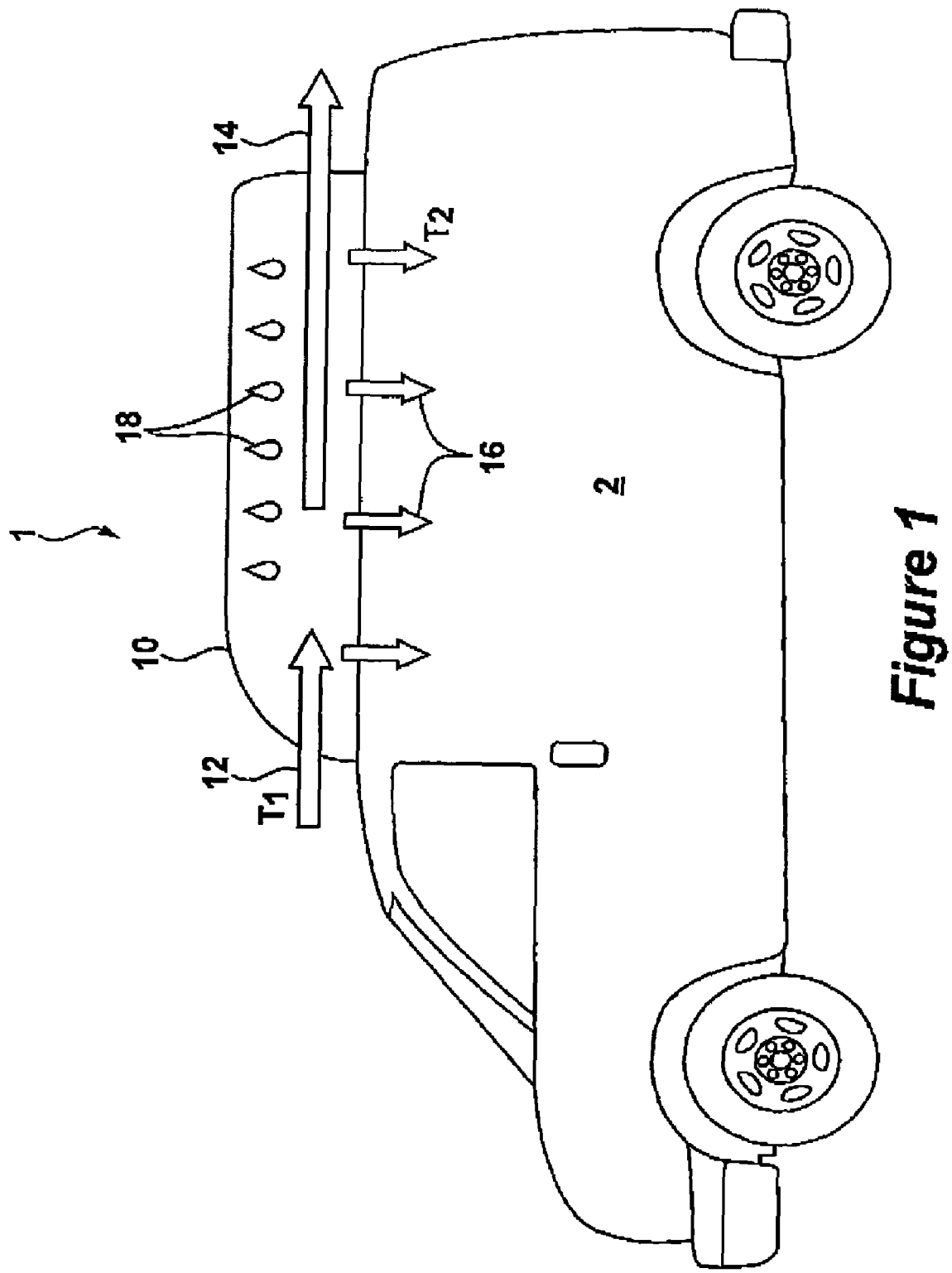
FIG. 1 is a schematic view of a vehicle and cooler according to the invention.

Referring to FIG. 1, there is shown a vehicle 1 provided with a vehicle cooler 10 according to the present invention. The vehicle has an interior space 2 in which the occupants of the vehicle are located. According to the present invention, the vehicle may be an automobile, truck or recreational vehicle. The invention is particularly advantageous for those situations where it is desirable to sleep or otherwise dwell within the vehicle. Under such conditions, it may be desirable to maintain the cooler operational for extended periods of time without leaving the motor running and without the requirement of an additional generator.

According to the schematic view of FIG. 1, the cooler 10 receives a flow of primary air 12 at a first temperature T1. The primary air 12 is cooled within the cooler 10 as will be described below by heat transfer to a flow of secondary air 14, which is exhausted to atmosphere. The cooled primary air 12 is supplied to the interior space 2 as a flow of product air 16 at a temperature T2. According to one aspect of the present invention, heat is transferred to the secondary air 14 by evaporation of moisture 18 into the secondary air 14.

No significant additional energy is input into the system. By conservation of energy, the energy removed from the primary air 12 by cooling from T1 to T2 is substantially equal to the energy added to the secondary air 14. The energy removed from the primary air 12 is equal to the product of the mass flow of the product air 16, the specific heat of the air and the temperature drop T1–T2. The energy gained by the secondary air 14 (given that there is no increase in temperature) is equal to the product of the latent heat of evaporation and the rate of this evaporation. By ensuring a sufficient rate of evaporation into the secondary air 14, the temperature drop of the primary air can be increased to achieve a temperature T2 of the product air 16, below the wet bulb temperature of the ambient air entering at T1.

Various different arrangements may be used to ensure the desired temperature drop. One device that can achieve temperatures down to close to the dew point of the ambient air is described in copending PCT applications PCT/NL03/00153 and PCT/EP03/12132, the contents of which are incorporated herein by reference in their entirety.

Figure 2:
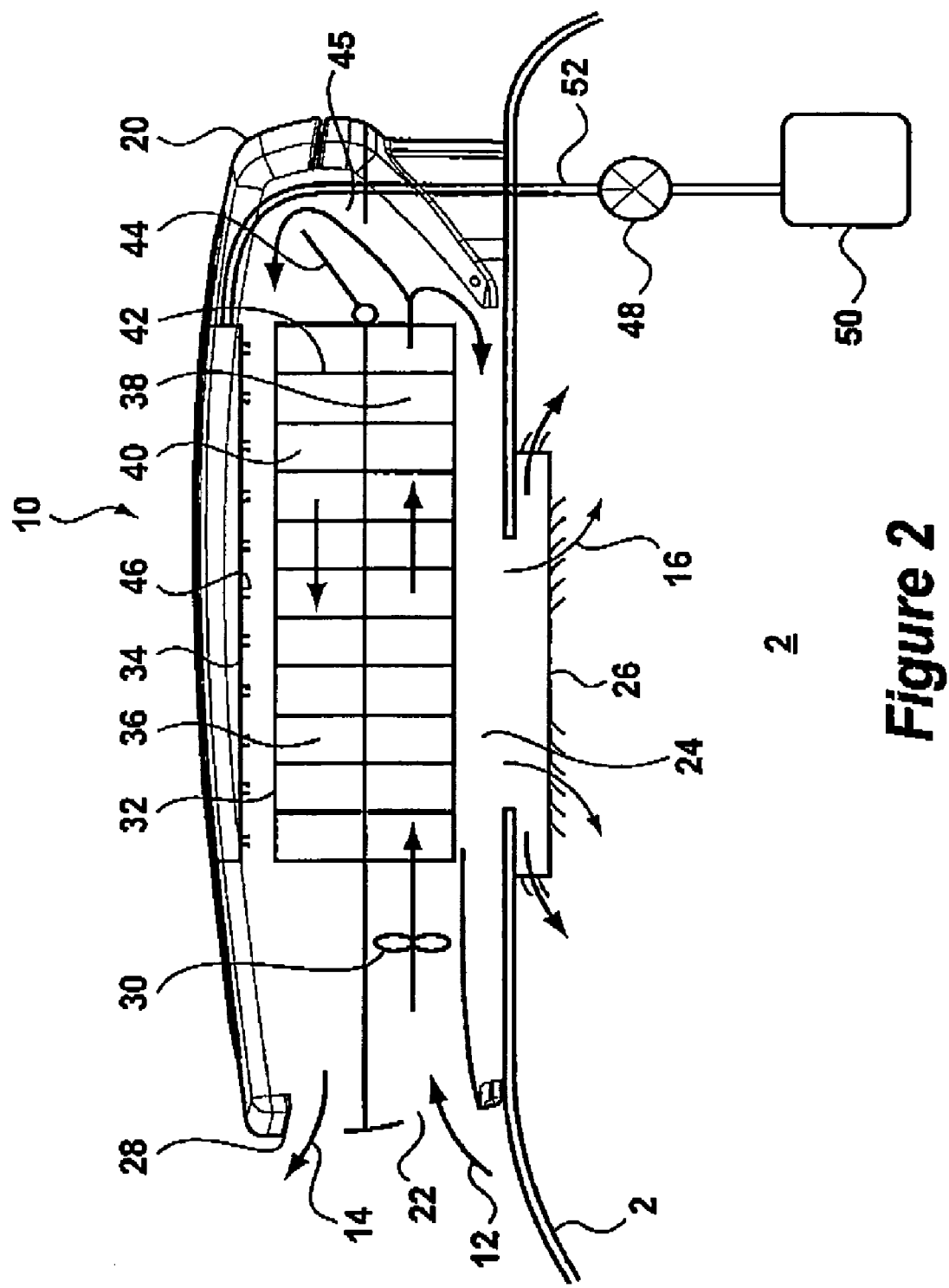
FIG. 2 is a cross sectional view of a vehicle cooler according to one embodiment of the present invention.

FIG. 2 shows in further detail an embodiment of the vehicle cooler of the present invention incorporating a device of the type described in PCT/NL03/00153. The vehicle cooler 10 comprises a housing 20 mounted on or otherwise connected to the roof of the vehicle 1. Although in the following, the cooler 10 is shown as a separate device mounted onto the roof of the vehicle, it is readily understood by the skilled person that the cooler could also be located within the interior of the vehicle or could also be integrated into the construction of the vehicle body. In this case, the housing 20 could be at least partially dispensed with.

The housing 20 is provided with an air inlet 22 for ambient air to enter the cooler 10 to form the flow of primary air 12. A product outlet 24 is provided on an undersurface of the housing 20 through which the product air 16 may exit from the cooler. The product outlet 24 communicates with an air distribution mechanism 26 in the roof of the vehicle 1. The housing 20 is further provided with a secondary outlet 28 or exhaust through which the secondary air 14 is exhaust to the atmosphere. Within the interior of the housing 20 are located the three principle components: a fan 30; a heat exchanger 32; and a water distributor 34.

Fan 30 may be a low pressure, low power device operating on either 110 V AC or 12 V DC and capable of producing a volumetric flow rate of up to 12000 cubic feet per hour from a maximum power input of 250 W. This maximum power may be required on initially starting the device in order to rapidly cool a hot vehicle interior. Under normal operating conditions however, a power supply of as low as 40 W may be sufficient to maintain an adequate flow of cooling air to the interior of the vehicle. Since fan 30 is the only item in the cooler requiring significant power input and because of its low steady state consumption, it is ideal for leaving operational for long periods, such as when the occupants of the vehicle are absent or sleeping. It is also ideally suited to operation by alternative low power energy sources such as solar panels or wind-powered devices. Fan 30 is located to receive primary air from the inlet 22 and pass it to the heat exchanger 32. Alternative circulation means may replace or support fan 30 including outside wind, or the movement of the vehicle.

Heat exchanger 32, shown schematically in FIG. 2, comprises a heat exchange membrane 36 having a first surface 38 and a second surface 40. A plurality of heat transfer elements 42 are arranged in the heat exchanger 32 to transfer heat from the first surface 38 to the second surface 40 as will be described below. Air inlet 22 communicates via the fan 30 with the first surface 38. A flap 44 allows flow communication between the first surface 38 and the second surface 40 whereby a portion of the primary air 12 can return over the second surface 40 as secondary air.

Water distributor 34, is located above the second surface 40 and comprises a plurality of drip outlets 46 for releasing water to wet the second surface 40. According to an important aspect of the present invention, it has been found desirable that the water is released in drip form substantially without formation of spray or vapor. Vapor formation directly from the water distributor 34 into the secondary air stream 14 has been found detrimental to good performance since it reduces the heat transfer from the second surface 40. It may also be a source of water borne diseases. The water distributor 34 is connected via a pump 48 to receive water from a storage tank 50 by a water supply line 52. A water return line (not shown) may be provided to return excess water from the bottom of the heat exchanger 32 to the water storage tank 50.

Operation of the vehicle cooler 10 will now be disclosed with the aid of FIG. 2. Primary air 12 is drawn into inlet 22 by operation of fan 30. The primary air 12 passing through fan 30 is directed over the first surface 38. Heat transfer elements 42 transfer heat away from the primary air causing it to become cool. As will be explained below, the primary air 12 after passing over the first surface 38 will be cooled substantially to the dew point temperature. At this temperature, the air is fully saturated and cannot be cooled further without water condensing. After passing over the first surface 38, the cooled primary air is separated into a stream of product air 16 and a stream of secondary air 14. The product air 16 is supplied via the product outlet 24 and the air distribution mechanism 26 to the interior space 2 of the vehicle. The secondary air 14 passes through flap 44 to an intermediate volume 45. From there, it passes over the second surface 40 of the heat exchanger. The division of the primary air 12 into secondary air 14 and product air 16 is determined by the position of the flap 44 and also by the resistance of the air distribution mechanism 26. Both of these may be adjustable. Operation of the water distributor 34 causes wetting of the second surface 40. The secondary air 14, flowing over the second surface 40 absorbs heat transferred from the first surface 38 by the heat transfer elements 42. As it starts to warm-up away from the dew point, the secondary air is able to absorb additional moisture. In doing so, further latent heat is absorbed. By ensuring that the moisture is absorbed from the wetted second surface 40 and not from droplets in the air stream, this latent heat causes further heat transfer from the primary air 12 flowing over the first surface 38. The secondary air 14 exits the housing 20 via secondary outlet 28 fully saturated with moisture and at substantially the same temperature as on inlet.

The above described operation represents the ideal operation of the vehicle cooler 10. Adjustment of the flap 44 or air distribution mechanism 26 can control the division of the primary air 12 to ensure adequate cooling of the product air 16 according to ambient conditions. Furthermore, it is noted that during supply of water to the second surface 40, the temperature of the product air 16 may rise due to over saturation of the secondary air 14. To overcome this, it has been found desirable to water the second surface 40 intermittently rather than continuously.

Figure 3:
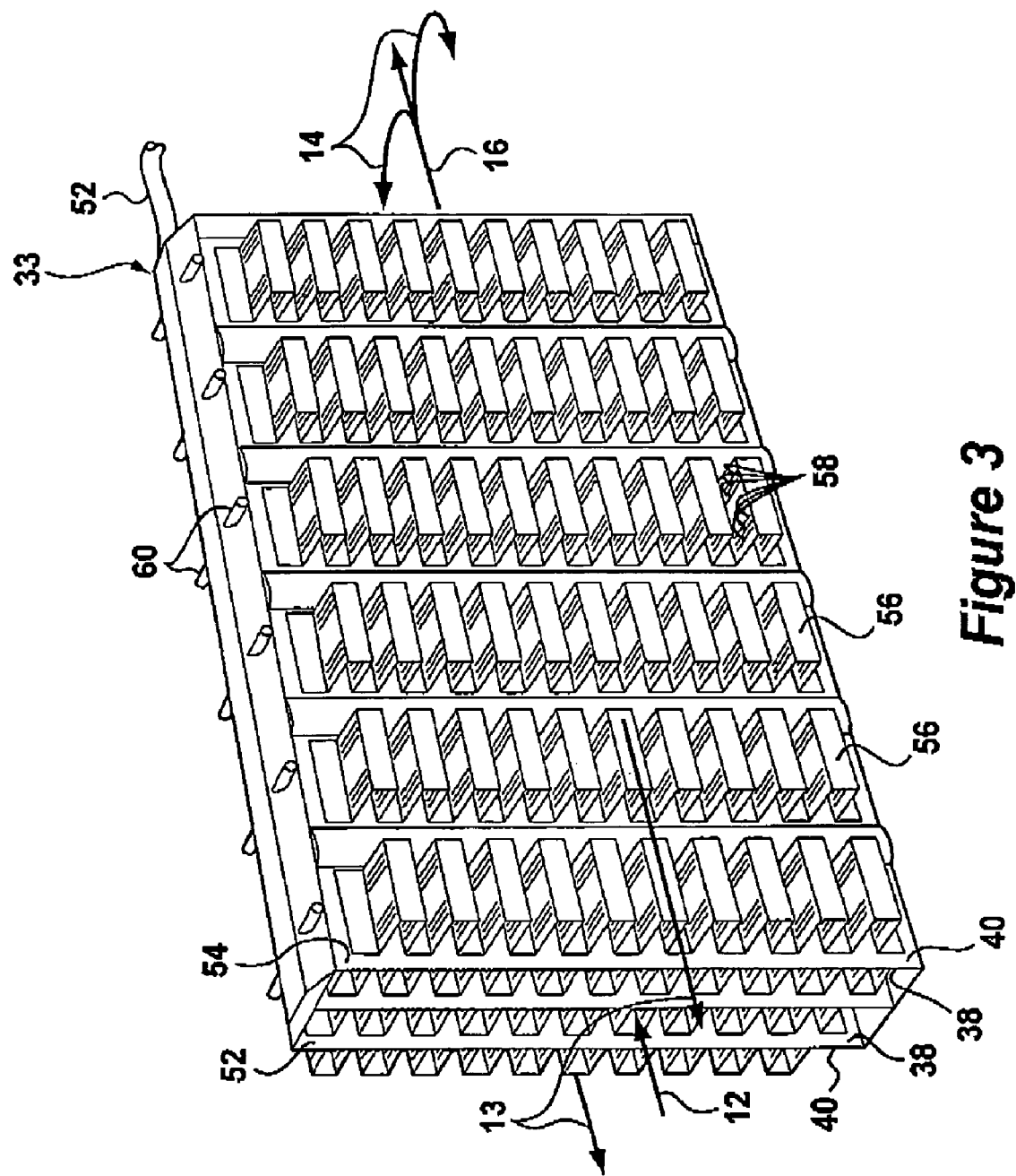
FIG. 3 is perspective view of a heat exchange element for use in a vehicle cooler.

FIG. 3 illustrates in further detail an exemplary construction of a heat exchange element 33. A number of such heat exchange elements may be arranged in parallel to form the heat exchanger 32. According to FIG. 3, the heat exchange element 33 comprises a membrane 52 formed into a generally tubular construction 54. The first surface 38 is located in the interior of the tubular construction 54 while the second surface 40 is formed by the outer surface of the tubular construction 54. The arrows 12, 14 and 16 indicate the flow of the primary, secondary and product air respectively. The membrane 52 may be formed of any appropriate material that can serve to separate the two flows and can transfer heat between its two surfaces. Preferably it is formed of aluminum. According to an important aspect of the present invention, the membrane 52 is provided with heat transfer elements in the form of fins 56 on both the first 38 and second surfaces 40. The fins 56 serve to increase the effective surface area of the first 38 and second surfaces 40 and improve heat transfer through the membrane 52. For this reason, they should be made from a material having good heat conduction properties such as aluminum. By forming both the membrane 52 and the fins 56 from aluminum, heat transfer throughout the heat exchange element 33 may be optimized.

In order to further improve heat transfer, the fins 56 are provided with louvers 58 which serve to break-up the various boundary layers in the flow and also encourage flow from one side of the fin to the other. According to the embodiment of FIG. 3, the water is supplied to the second surface 40 via a series of drip outlets 60 communicating with the water supply line 52.

Figure 4:
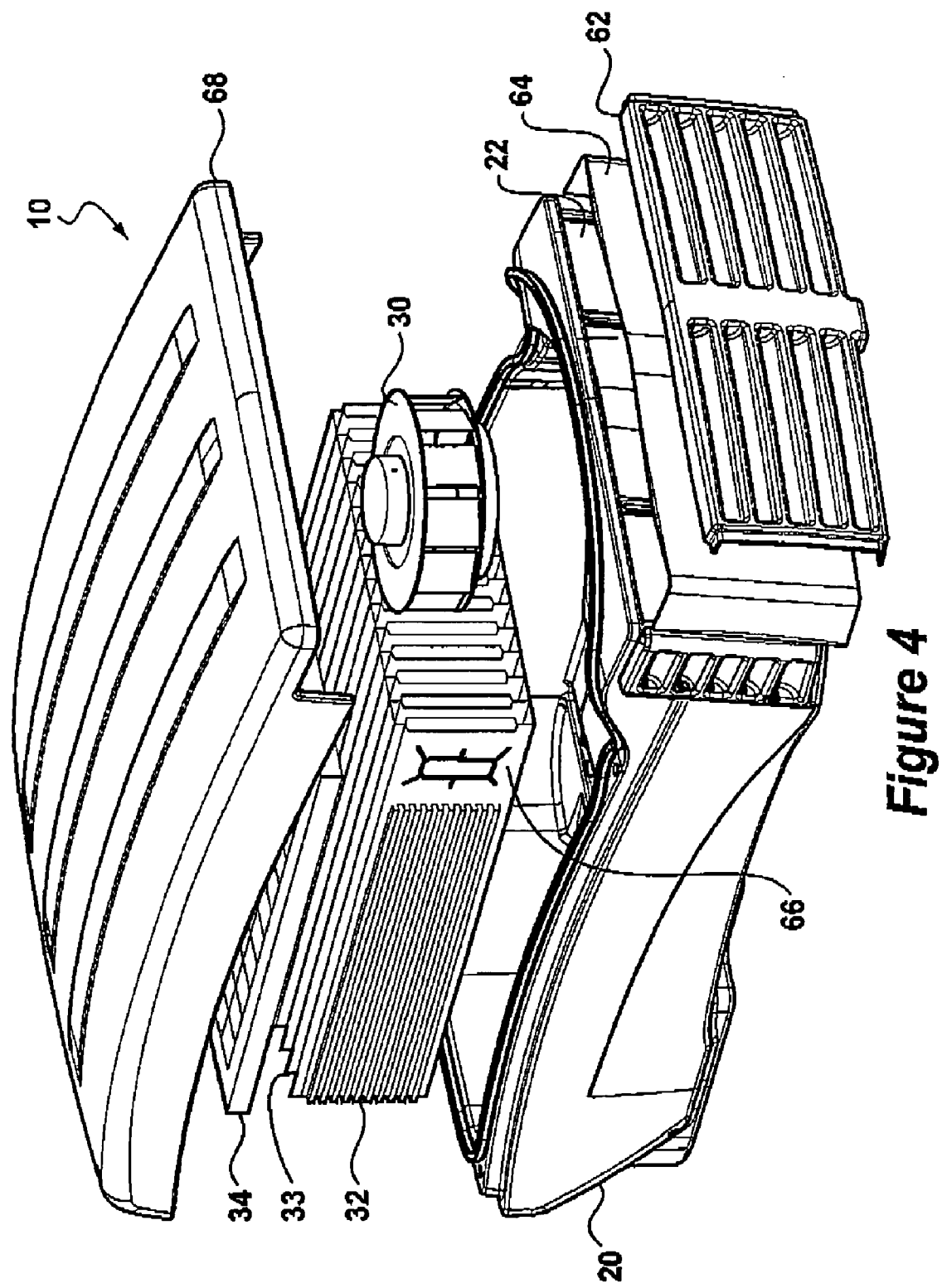
FIG. 4 is an exploded perspective view of a preferred embodiment of the invention.

The second surface 40 of the heat exchange element 33 is provided with a water retaining layer (not shown). The water retaining layer may be applied over the totality of the second surface 40 including the fins 56. Alternatively and preferably, the second surface is only partially covered, preferably in an intermittent pattern. In this way, the secondary air 14 flowing over the second surface 40 is repeatedly exposed to direct heat from the uncovered regions and latent heat by evaporation from the covered regions. Preferably, only the outer faces of the fins 56 on the second surface 40 is provided with the water retaining layer. The water retaining layer may be formed of any material that is capable of retaining a quantity of water and relinquishing it easily into a partially saturated air stream. Preferably the material is hydrophilic but not hygroscopic. Ceramic materials such as Portland cement and fibrous materials have been found ideal, as they are able to retain water by surface tension effects only. An exemplary material for forming the water retaining layer is a 20 g/m2 polyester/viscose 50/50 blend, available from Lantor B.V. in The Netherlands FIG. 4 shows an exploded perspective view of the vehicle cooler 10 according to a preferred mode of the present invention showing the housing 20, fan 30, heat exchanger 32 and water distributor 34. FIG. 4 also illustrates further constructional details of the air inlet 22. The air inlet 22 is provided with an inlet grille 62 and a filter 64.

As can be seen from FIG. 4, the heat exchanger 32 comprises a bank of heat exchange elements 33 of the type illustrated in FIG. 3. The heat exchange elements 33 are arranged in a thin plastic sleeve (not shown), which serves to keep them together and also serves as a channel for airflow to and from the heat exchanger 32. According to the embodiment of FIG. 4, for integration into the vehicle cooler, the heat exchange elements 33 are each provided with an inlet extension 66 without fins. The inlet extension 66 protrudes through the plastic sleeve for receiving primary air 12 from the fan 30. The secondary 14 air passing over the outside of the inlet extension is communicated via an opening in the base of the plastic sleeve to the secondary outlet 28 through the base of the housing 20.

The water distributor 34 is in the form of a tray which sits over the heat exchanger and connects to the plastic sleeve. The water distributor may be a device according to co-pending PCT application number PCT/EP04/01927, filed 26 Feb. 2004 the contents of which are incorporated herein by reference in their entirety. The housing 20 is closed by a removable cover 68.

Figure 5:
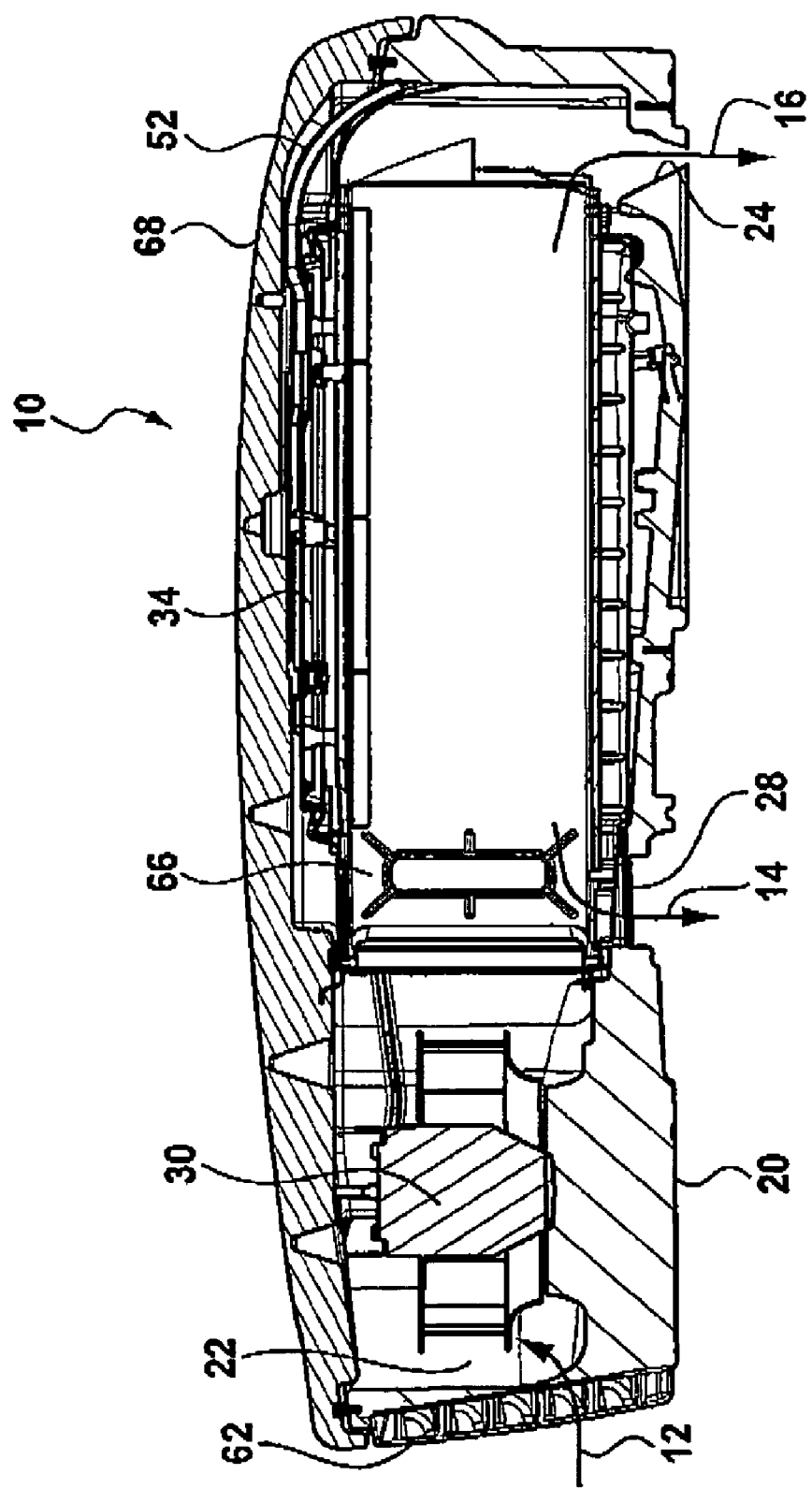
FIG. 5 is a cross-section through the cooler of FIG. 4 in assembled state.

FIG. 5 shows a longitudinal cross-section along the centre line of the vehicle cooler 10 of FIG. 4 in the assembled condition. In this view, the inlet 22, product outlet 24 and secondary outlet 28 can be seen. In this view, the details of the fins 56 have been omitted for the sake of clarity. Other elements are referenced with the same reference numbers as in previous figures.

The invention has been described by reference to certain embodiments as discussed above. It will be recognized that these embodiments are susceptible to various modifications and alternative forms well known to those of skill in the art. In particular, while specific reference has been made above to an automobile or recreational vehicle, other forms of vehicle such as boats, mobile homes and caravans could also incorporate such a cooler.

Furthermore, although a fan has been depicted, for use in a moving vehicle or in areas where sufficient ambient wind is always present, the fan could be omitted. In such case, alternative inlet and outlet arrangements could be provided to ensure correct directionality with respect to the prevailing wind. Additionally, the vehicle cooler may be operated to provide heat recovery from ventilated air during cold periods by closing the flap 44 and providing an additional vent for directing air from the vehicle interior 2 over the second surface 40.

Many modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A vehicle cooler for cooling a flow of primary air from a first temperature to a second temperature and delivering at least a portion of the primary air at the second temperature to a vehicle interior, the vehicle cooler comprising:
   a first surface for cooling the primary air;
   a second surface for humidifying a flow of secondary air by evaporation of liquid from the surface; and
   a plurality of heat transfer elements for transferring heat from the first surface to the second surface;
   wherein the second temperature is below a wet bulb temperature of the primary air.

2. The vehicle cooler according to claim 1, further comprising a flow channel from the first surface to the second surface and wherein the secondary air comprises a portion of the primary air separated from the flow of primary air after cooling by the first surface.

3. The vehicle cooler according to claim 1, wherein the first and second surfaces are located on opposite surfaces of a heat exchange membrane.

4. The vehicle cooler according to claim 3, wherein the primary air flows over the first surface in a first direction and the secondary air flows over the second surface in a second direction substantially opposite to the first direction.

5. The vehicle cooler according to claim 3, wherein the heat transfer elements extend outwardly from the heat exchange membrane to increase an effective surface area thereof.

6. The vehicle cooler according to claim 5, wherein the heat conducting elements are metal fins generally aligned with a direction of air flow.

7. The vehicle cooler according to claim 1, wherein the second surface comprises a liquid retaining layer for retaining a liquid to be evaporated.

8. The vehicle cooler according to claim 1, wherein the secondary air is cooled to a temperature below the first temperature prior to humidifying at the second surface.

9. The vehicle cooler according to claim 1, further comprising a housing for containing the first and second surfaces and including flow channels for directing the flows of primary air and secondary air.

10. The vehicle cooler according to claim 9, wherein the housing is aerodynamically shaped for attachment to an exterior of a vehicle and an outlet from the housing for primary air is arranged to engage with a corresponding opening into an interior of the vehicle.

11. A method of cooling the interior habitable space of a vehicle comprising:

passing a flow of primary air over a first surface to cool the primary air from a first temperature to a second temperature below the wet bulb temperature of the primary air;

conducting heat from the first surface to a second surface;

supplying water to the second surface;

passing a first portion of the flow of primary air over the second surface to absorb water from the second surface; and supplying a second portion of the primary air at the second temperature to the interior living space of the vehicle.

12. The method according to claim 11, wherein the water is supplied to the second surface intermittently.

13. The method according to claim 11, wherein the second surface is provided with a water retaining layer and the water is supplied to the water retaining layer.

14. The method according to claim 11, wherein a first portion of the primary air is supplied to the interior living space of the vehicle and a second portion of the cooled primary air is supplied to the second surface as the secondary air.

15. A vehicle cooler for cooling ambient air and supplying the cooled air to a vehicle interior, the cooler comprising:

a housing having an inlet in communication with ambient air, an outlet in communication with the vehicle interior and an exhaust in communication with ambient air;

circulation means for circulating air through the housing;

a heat exchanger having a first channel communicating the inlet with the outlet and a second channel communicating with the exhaust;

a water distributor for supplying water to the second channel of the heat exchanger;

a bypass communicating an outlet end of the first channel with the second channel; and a bypass control valve for controlling the relative size of the bypass with respect to the outlet.

16. A vehicle cooler for cooling ambient air and supplying the cooled air to a vehicle interior, the cooler comprising:

a housing having an inlet in communication with ambient air, an outlet in communication with the vehicle interior and an exhaust in communication with ambient air;

circulation means for circulating air through the housing;

a heat exchanger having a first channel communicating the inlet with the outlet and a second channel communicating with the exhaust;

a water distributor for supplying water to the second channel of the heat exchanger;

a bypass communicating an outlet end of the first channel with the second channel wherein the heat exchanger comprises a tubular membrane, the first channel being located in an interior of the tabular membrane and the second channel being located on an exterior of the tabular membrane, whereby heat transfer can take place between the two channels through the membrane and wherein the membrane comprises aluminum.

17. The vehicle cooler according to claim 16, wherein the membrane is provided with heat conducting fins protruding into the first and second channels.

18. The vehicle cooler according to claim 17, wherein the fins in the second channel are partially coated with a water retaining layer.

19. The vehicle cooler according to claim 17, wherein the fins are provided with louvers.

20. The vehicle cooler according to claim 6, wherein the fins are provided with louvers.

* * * * *